US006497318B2

(12) United States Patent
Schulte et al.

(10) Patent No.: US 6,497,318 B2
(45) Date of Patent: Dec. 24, 2002

(54) PEOPLE MOVER, SUCH AS A MOVING WALKWAY OR ESCALATOR, WITH A HANDRAIL, AND A HANDRAIL FOR A PEOPLE MOVER, SUCH AS A MOVING WALKWAY OR ESCALATOR

(75) Inventors: Karl Schulte, Buchholz (DE); Christian-André Keun, Hamburg (DE)

(73) Assignee: New-York Hamburger Gummi-Waaren Compagnie Aktiengesellschaft, Hamburg (DE)

( * ) Notice: Subject to any disclaimer, the term of this patent is extended or adjusted under 35 U.S.C. 154(b) by 0 days.

(21) Appl. No.: 09/874,933

(22) Filed: Jun. 5, 2001

(65) Prior Publication Data

US 2002/0084169 A1 Jul. 4, 2002

Related U.S. Application Data

(63) Continuation of application No. 09/159,345, filed on Sep. 23, 1998, now abandoned.

(51) Int. Cl.[7] .............................................. B65G 23/22

(52) U.S. Cl. ..................................................... 198/337

(58) Field of Search ......................................... 198/337

(56) References Cited

U.S. PATENT DOCUMENTS 5,255,772 A * 10/1993 Ball et al. .................. 198/337

FOREIGN PATENT DOCUMENTS

| | | | | |
|---|---|---|---|---|
| DE | 2000266 | * 7/1971 | ................. | 198/337 |
| DE | 2129582 | * 12/1972 | ................. | 198/337 |
| DE | 2142098 | * 3/1973 | ................. | 198/337 |
| DE | 3921887 | * 1/1991 | ................. | 198/337 |
| JP | 52-31481 | * 3/1977 | ................. | 198/337 |
| JP | 2-70690 | * 3/1990 | ................. | 198/337 |

* cited by examiner

*Primary Examiner*—James R. Bidwell
(74) *Attorney, Agent, or Firm*—Nils H. Ljungman & Associates

(57) ABSTRACT

This invention relates to a handrail for a people mover, such as an escalator or moving walkway, with a grip for people to grasp and a one-piece structure comprising several layers with structural inserts, with the layers being joined together to form the one-piece structure.

14 Claims, 3 Drawing Sheets

PEOPLE MOVER, SUCH AS A MOVING WALKWAY OR ESCALATOR, WITH A HANDRAIL, AND A HANDRAIL FOR A PEOPLE MOVER, SUCH AS A MOVING WALKWAY OR ESCALATOR

This application is a continuation of U.S. application Ser. No. 09/159,345, filed on Sep. 23, 1998, abandoned.

BACKGROUND OF THE INVENTION

1. Field of the Invention

The present invention relates to a handrail for a people mover, such as an escalator or moving walkway, with a grip for people to grasp and a one-piece structure comprising several layers.

2. Background Information

Handrails of this type are described by the known art. Many of the current embodiments consist primarily of layered, C-shaped strips or bands with structural inserts. The layers in the strips or bands are constructed separately, then joined together by more layers, such as ones made of elastomer materials.

The manufacture of handrails is a lengthy and complicated process. The handrails are produced in various lengths of the layered structure. Each of the lengths must be processed in batches or segments of the strips. The process joins the layers using a material to form a single molded strip or band.

The disadvantages of a fabrication process of the type described above include the time-consuming and expensive pre-assembly step and the transport and insertion of the individual components, not to mention the fact that the fabrication must be performed in batches or discontinuously using the pressing process, as a result of which burrs are formed at the separation level of the press mold, and there are fluctuations in the quality of the longitudinal segments pressed.

OBJECT OF THE INVENTION

The object of the present invention is to simplify the fabrication of a handrail of the type described above by means of its pre-fabricated structure, and to create a configuration which satisfies the requirements and is easier to repair.

SUMMARY OF THE INVENTION

The invention teaches that this object can be accomplished if the layers are combined into a one-piece textile structure and can be connected to the grip in a single fabrication step.

Consequently, only one module is connected with the grip in the form of an insert that has high tensile strength and a rigid shape. The module has a sandwich-like structure, the characteristics (rigidity, strength) of which can be adapted to the respective individual requirements which may differ over the width of the product. As a result of this restriction to an essentially single unit module, the ease of repair of the handrail is also increased.

In one favorable embodiment of the invention, the textile structure is formed from at least the following parts:

- a reinforcement layer made of high-modulus fibers that run lengthwise,
- a transverse reinforcement made of fibers that run crossways,
- an anti-friction layer made of polymer fibers in the form of a polymer structure.

The invention also teaches that the reinforcement layer can be formed by high-modulus fibers that run longitudinally, such as polymer fibers (aramid, polyester, polyamide), carbon, glass or steel fibers.

For the realization of the transverse reinforcement, the invention also teaches that the fibers for the transverse reinforcement can be formed by polymer and/or glass fibers.

A favorable realization of a connection of grip and textile structure consists of the fact that the grip and insert—in the form of a textile structure—can be connected to one another by co-extrusion.

In other words, in one preferred embodiment of this invention, the grip and textile structure or insert can be connected to each other by a co-extrusion process.

In this case, the endless textile structure can be transported under bias or pre-stress to an extruder in which the grip material is extruded around the textile structure. The profiling can take place in the extruder and/or following the extrusion on a cooling and calibration line.

The present invention teaches that alternatively, the grip and insert can be joined to one another by an adhesive connection.

The present invention also teaches that a longitudinal reinforcement can be located only in the center region.

In an additional realization, the grip can be formed from a thermoplastic elastomer material.

To adapt the characteristics of the finished product to the respective requirements, the invention teaches that a textile structure can be located below and/or inside the grip.

BRIEF DESCRIPTION OF THE DRAWINGS

The accompanying drawings present schematic illustrations of at least one embodiment of the present invention, in which.

DESCRIPTION OF THE PREFERRED EMBODIMENT

Figure 1:
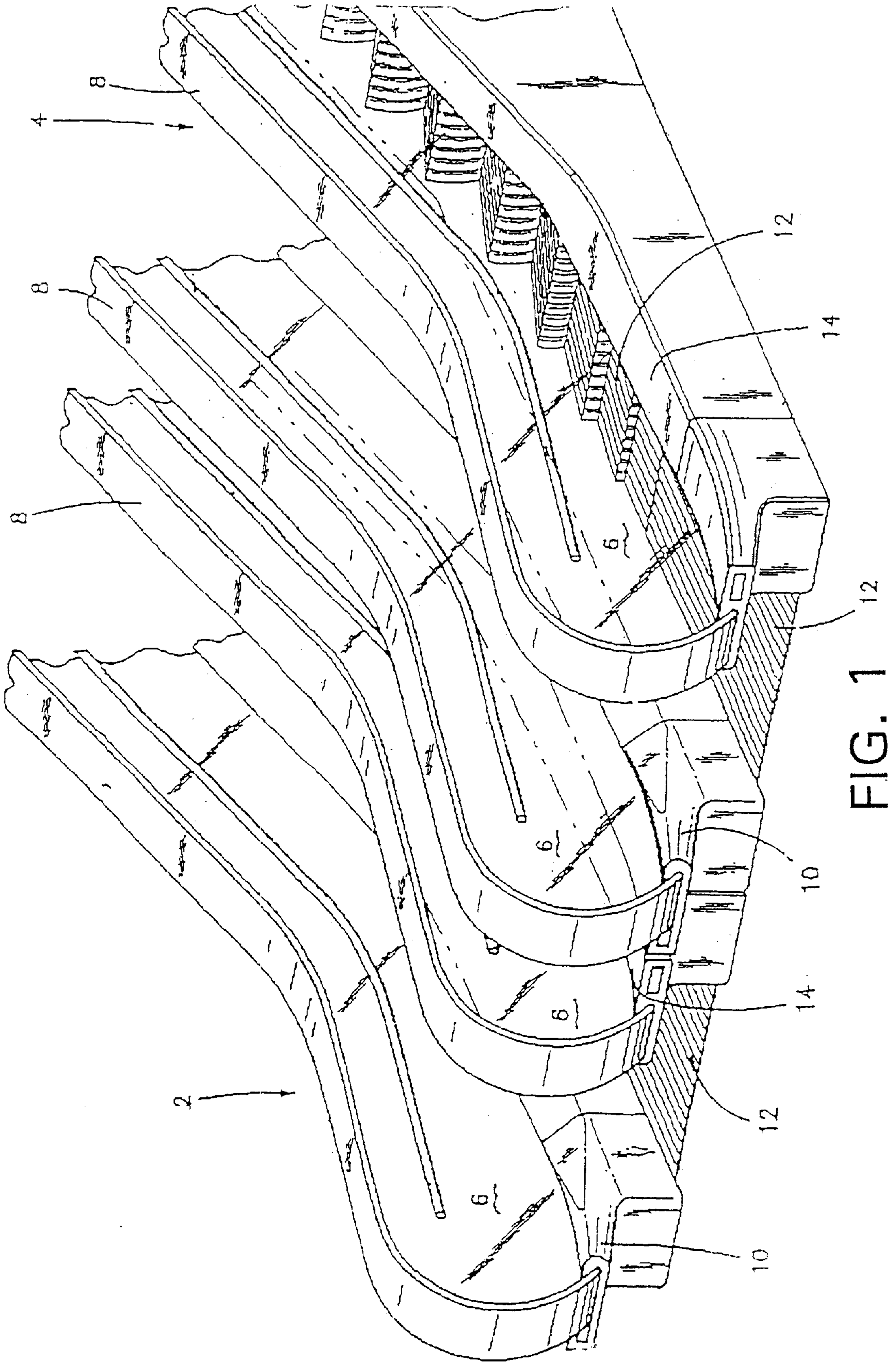
FIG. 1 shows one possible embodiment of an escalator with a handrail.

FIG. 1 shows one possible embodiment of the handrail as it relates to a set of ascending and descending escalators 2, 4. Each escalator has a pair of balustrades 6. The handrails 8 move along the balustrades 6. Inner skirt panels 10 flank the escalator steps 12. Outer deck panels 14 are disposed on the sides of the balustrades 6 away from the steps 12.

Figure 1A:
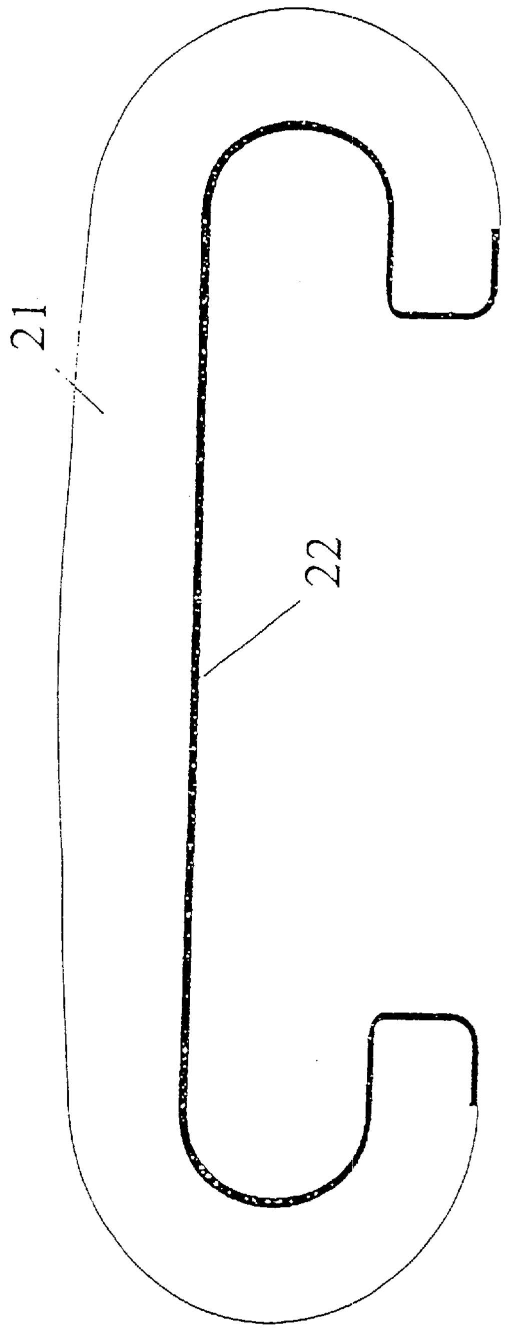
FIG. 1A shows the overall construction of a handrail.

FIG. 1A shows a cross-section of the handrail shown in FIG. 1, with a grip 21 and a textile structure 22.

The system consists of a grip 21 and a textile structure 22 which are preferably connected to one another by co-extrusion.

Figure 2:
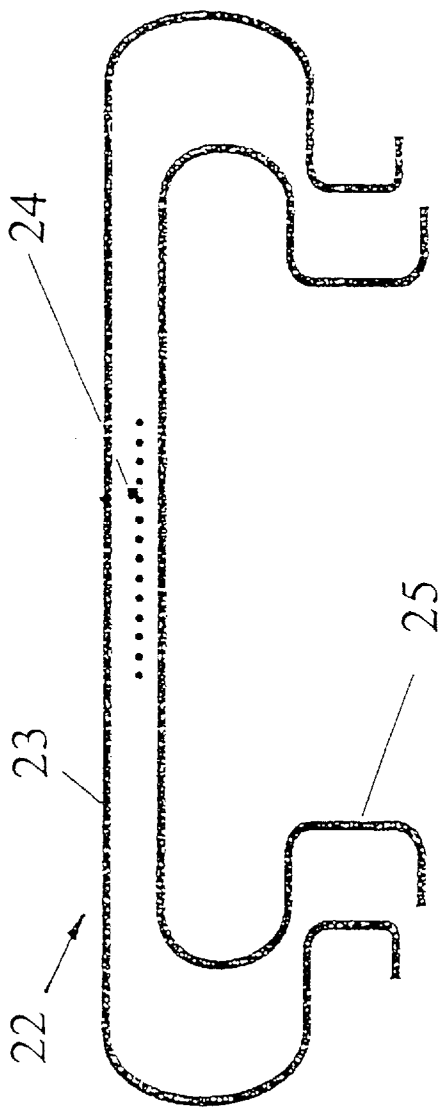
FIG. 2 shows the construction of the individual elements of the textile structure.
Figure 3:
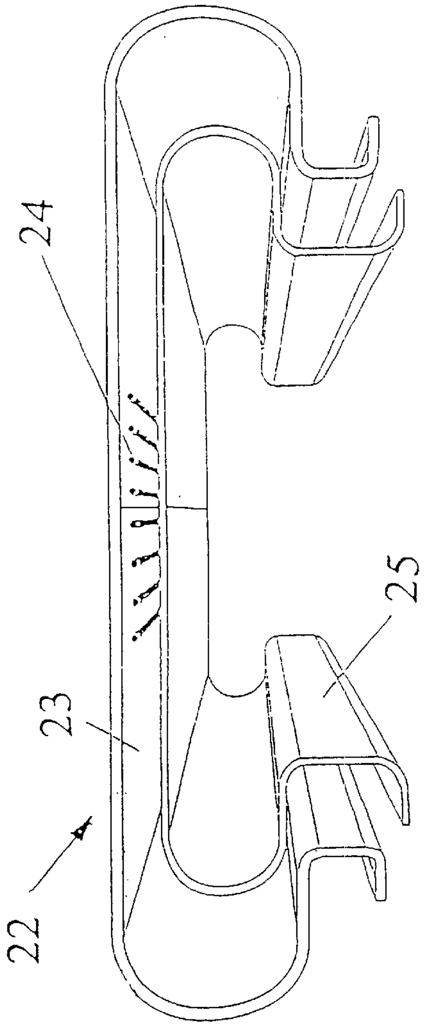
FIG. 3 is a view in perspective of the elements illustrated in FIG. 2.

FIGS. 2 and 3 further show the components of the textile structure 22. The components are shown in layers 23, 24 and 25.

In this case, the textile structure is made up of three parts, namely a transverse reinforcement 23, a longitudinal reinforcement 24 and a friction-reducing layer 25.

The textile structure 22 can be achieved by warp-knitting. Using this technology, a plurality of different types of fibers can be worked in two and even three dimensions. It is thereby possible to design, construct, engineer or create individual characteristics in a knit to optimally meet the requirements of the specific application. The knitting process is also economical, apart from the complex preparation of the knitting machines.

A fiber made of aramid (poly-p-phenylene-terephthalamide) can be used for the longitudinal reinforcement 24 which can be provided only in the central web portion of the handrail. The selection of the fiber can be made on the basis of the following parameters:

- type of fiber,
- titer of fiber (weight per length of fiber),
- twist (twisting of the fiber),
- avivage or softening (chemical secondary treatment or curing of the fibers).

Other types of reinforcement may also be selected for use as the longitudinal reinforcement 24 in the vicinity of the web and the lip of the grip 21, on account of the specific requirements set for these particular areas. The objective is to essentially guarantee a high flexural strength and shape stability of the composite. Different polyester fibers can be used that can be worked into a complex warp-knitted structure. The fibers can be selected on the basis of the following parameters:

- type of fiber (heat shrinkage, mono/multi-filament etc.),
- fiber titer (weight per length of fiber),
- twist (twisting of the fiber),
- avivage (chemical secondary treatment of the fibers),
- arrangement of the fibers at the level of the knit (spacing),
- partial weft formation,
- fiber orientation.

Polyester fibers that were developed especially for the tire industry are characterized by a good bonding or connection of the elastomers as a result of their additional elevated polarity.

With these fibers, heat shrinkage is also low. Monofilament fibers also have a higher compression strength than multifilament fibers.

As the anti-friction layer 25, a fiber layer made of a texturized polyamide or polyester is worked onto the underside of the knit. When a friction load is applied, this anti-friction layer mats and thus forms a smooth sliding surface. The textile processing is selected so that the lacing cords do not project or emerge on the surface, which means that the lacing cords cannot be damaged by abrasion.

To further explain, in one possible embodiment of the present invention the underside of the knit has a layer of woven fabric, such as polyester or polyamide, which constitutes the slider portion of the handrail. The fabric layer, or anti-friction layer 25, could possibly be burnished to make the surface smooth in order to permit the handrail to slide along a guide rail with a very reduced amount of friction.

The textile structure 22 formed in this manner is then bonded to the grip 21. This connection can be achieved by adhesive bonding or co-extrusion, for example.

Figure 4:
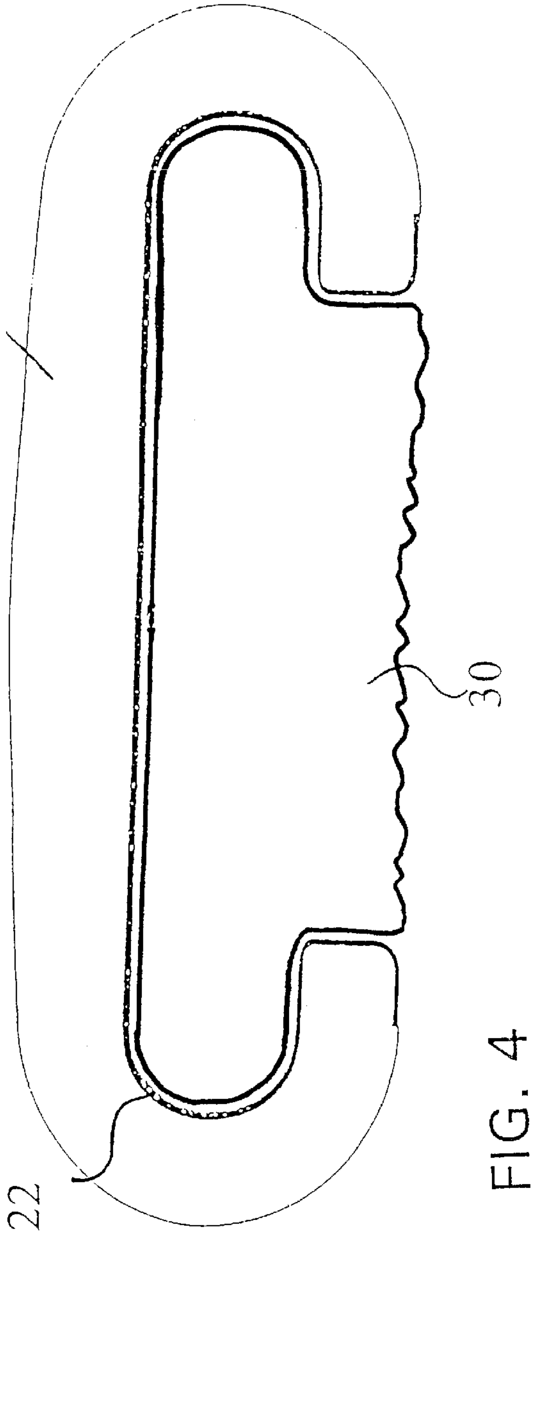
FIG. 4 shows one possible embodiment of a guide for a handrail.

FIG. 4 shows one possible embodiment of a guide 30 for a handrail. The grip 21 and textile structure 22 are also shown. The guide 30 is disposed in or on at least an upper portion of a balustrade 6 to guide the handrail in its path of movement (see FIG. 1).

One feature of the invention resides broadly in a people mover, such as an escalator or moving walkway, said mover comprising: a movable surface; said movable surface being configured to move to transport people; at least one balustrade; said at least one balustrade being disposed adjacent said movable surface; said at least one balustrade having an inner skirt panel; said inner skirt panel being disposed adjacent said movable surface; said inner skirt panel being disposed adjacent a bottom portion of said at least one balustrade; said at least one balustrade having an outer deck panel; said outer deck panel being disposed adjacent said bottom portion of said at least one balustrade; said at least one balustrade comprising a guide structure; said guide structure being disposed in or on at least an upper portion of said at least one balustrade; a handrail; said guide structure being configured to guide said handrail; said handrail being configured and disposed to move along said guide structure on at least an upper portion of said at least one balustrade; said handrail comprising: a grip portion to be gripped by the hand of a user of said people mover; a layer to stabilize and retain the shape of said grip portion; said stabilizing layer comprising at least one elongated member having an elongated dimension and at least one other dimension smaller than said elongated dimension of said at least one elongated member; said at least one elongated member having a longitudinal axis along said elongated dimension of said at least one elongated member; said longitudinal axis of said at least one elongated member being oriented in a transverse direction with respect to the direction of movement of said handrail; a final layer being configured and disposed to reduce friction between said handrail and said guide structure; said friction-reducing layer being disposed between said stabilizing layer and said guide structure; a layer to reinforce the structure of said handrail; said reinforcing layer comprising at least one elongated insert having an elongated dimension and at least one other dimension smaller than said elongated dimension of said at least one elongated insert; said at least one elongated insert having a longitudinal axis along said elongated dimension of said at least one elongated insert; said longitudinal axis of said at least one elongated insert being oriented along the direction of movement of said handrail; said reinforcing layer being disposed between said stabilizing layer and said friction-reducing layer; said stabilizing layer, said friction-reducing layer and said reinforcing layer being connected to each other to form a one-piece structure; and said one-piece structure being disposed between said grip portion and said guide structure; said one-piece structure being connected to said grip portion.

Another feature of the invention resides broadly in a handrail for a people mover, such as an escalator or moving walkway, said handrail comprising: a grip portion to be gripped by the hand of a user of said people mover; said grip portion having an elongated dimension and at least one other dimension smaller than said elongated dimension of said grip portion; a layer being configured and disposed to reduce friction between said handrail and a guide structure of a people mover; a layer to stabilize and retain the shape of said grip portion; said stabilizing layer comprising at least one elongated member having an elongated dimension and at least one other dimension smaller than said elongated dimension of said at least one elongated member; said at least one elongated member having a longitudinal axis along said elongated dimension of said at least one elongated member; said longitudinal axis of said at least one elongated member being oriented in a transverse direction with respect to said elongated dimension of said grip portion; said stabilizing layer being disposed between said grip portion and said friction-reducing layer; a layer to reinforce the structure of said handrail; said reinforcing layer comprising at least one elongated insert having an elongated dimension and at least one other dimension smaller than said elongated dimension of said at least one elongated insert; said at least one elongated insert having a longitudinal axis along said elongated dimension of said at least one elongated insert; said longitudinal axis of said at least one elongated insert being oriented along said elongated dimension of said grip portion; said reinforcing layer being disposed between said stabilizing layer and said friction-reducing layer; said stabilizing layer, said friction-reducing layer and said reinforcing layer being connected to each other to form a one-piece structure; and said one-piece structure being disposed adjacent to and attached to said grip portion.

Yet another feature of the invention resides broadly in the method for making a handrail for a people mover, such as an escalator or moving walkway, said handrail comprising: a grip portion to be gripped by the hand of a user of said people mover; said grip portion having an elongated dimension and at least one other dimension smaller than said elongated dimension of said grip portion; a layer being configured and disposed to reduce friction between said handrail and a guide structure of a people mover; a layer to stabilize and retain the shape of said grip portion; said stabilizing layer comprising at least one elongated member having an elongated dimension and at least one other dimension smaller than said elongated dimension of said at least one elongated member; said at least one elongated member having a longitudinal axis along said elongated dimension of said at least one elongated member; said longitudinal axis of said at least one. elongated member being oriented in a transverse direction with respect to said elongated dimension of said grip portion; said stabilizing layer being disposed between said grip portion and said friction-reducing layer; a layer to reinforce the structure of said handrail; said reinforcing layer comprising at least one elongated insert having an elongated dimension and at least one other dimension smaller than said elongated dimension of said at least one elongated insert; said at least one elongated insert having a longitudinal axis along said elongated dimension of said at least one elongated insert; said longitudinal axis of said at least one elongated insert being oriented along said elongated dimension of said grip portion; said reinforcing layer being disposed between said stabilizing layer and said friction-reducing layer; said stabilizing layer, said friction-reducing layer and said reinforcing layer being connected to each other to form a one-piece structure; and said one-piece structure being disposed adjacent to and attached to said grip portion, said method comprising the following steps of: combining said stabilizing layer and said reinforcing layer into one layer using a warp-knitting process; joining said friction-reducing layer with said stabilizing layer and said reinforcing layer into said one-piece structure; and attaching said one-piece structure to said grip using a fabrication or single fabrication process, such as co-extrusion or adhesive bonding.

Still another feature of the invention resides broadly in the handrail for moving walkways and escalators with a grip made of polymer material, a reinforcement layer that absorbs tensile forces, a shape-stabilizing layer consisting of textile inserts oriented in a transverse direction, and a final anti-friction layer, characterized by the fact that the layers are combined into a one-piece textile structure and can be connected to the grip in a fabrication process, such as a single fabrication process.

A further feature of the invention resides broadly in the handrail characterized by the fact that the textile structure is formed from at least the following parts: a reinforcement layer made of high-modulus fibers that run longitudinally; a transverse reinforcement with fibers oriented transversely; and an anti-friction layer made of polymer fibers in the form of a textile structure.

Another feature of the invention resides broadly in the handrail characterized by the fact that the reinforcement layer is made of high-modulus, longitudinally oriented fibers such as polymer fibers (aramid, polyester, polyamide), carbon, glass or steel fibers.

Yet another feature of the invention resides broadly in the handrail characterized by the fact that the fibers for transverse reinforcement are made of polymer and/or glass fibers.

Still another feature of the invention resides broadly in the handrail characterized by the fact that the grip and insert can be combined into a textile structure by means of co-extrusion.

A further feature of the invention resides broadly in the handrail characterized by the fact that the grip and insert can be joined together by adhesive.

Another feature of the invention resides broadly in the handrail characterized by the fact that a longitudinal reinforcement is located only in the central portion.

Yet another feature of the invention resides broadly in the handrail characterized by the fact that the grip is made of a thermoplastic elastomer material.

Still another feature of the invention resides broadly in the handrail characterized by the fact that a textile structure is located underneath and/or inside the grip.

To further explain the instant invention, this invention further relates to a handrail for moving walkways and escalators with a grip made of polymer material, a reinforcement layer that absorbs tensile forces, a shape stabilizing layer consisting of textile inserts oriented in the transverse direction and a final anti-friction layer.

Handrails of this type are described by the known art, whereby the commercially available embodiments consist primarily of rubber with metal and textile inserts and are realized in the form of a C-shaped strip or band. In this case, there is a multiple-layer or laminated structure made of separate metal or textile inserts which may be connected to one another by additional layers of rubber or elastomer material.

The manufacture of handrails is a relatively time-consuming process on account of the structure, which must be pre-assembled or pre-fabricated. As a result of the multi-layer structure, the fabrication method generally used is vulcanizing pressing. When pressure is applied, the individual system components are joined in a connection with the matrix material.

The disadvantages of a fabrication process of the type described above include the time-consuming and expensive pre-assembly step and the transport and insertion of the individual components, not to mention the fact that the fabrication must be performed in batches or discontinuously using the pressing process, as a result of which burrs are formed at the separation level of the press mold, and there are fluctuations in the quality of the longitudinal segments pressed.

For the realization of handrails consisting of a grip and corresponding inserts, the present invention teaches the inclusion as a reinforcement layer of a shape-stabilizing layer in the transverse direction and a final anti-friction layer, the connection of the inserts into a one-piece textile structure, and the connection with the grip in a fabrication step, such as a single fabrication step.

The components disclosed in the various publications, disclosed or incorporated by reference herein, may be used in the embodiments of the present invention, as well as, equivalents thereof.

The appended drawings in their entirety, including all dimensions, proportions and/or shapes in at least one embodiment of the invention, are accurate and to scale and are hereby included by reference into this specification.

All, or substantially all, of the components and methods of the various embodiments may be used with at least one embodiment or all of the embodiments, if more than one embodiment is described herein.

All of the patents, patent applications and publications recited herein, and in the Declaration attached hereto, are hereby incorporated by reference as if set forth in their entirety herein.

The corresponding foreign patent publication applications, namely, Federal Republic of Germany Patent Application No. 197 42 258.6, filed on Sep. 25, 1997, having inventors Karl Schulte and Christian-Andre Keun, and DE-OS 197 42 258.6 and DE-PS 197 42 258.6, as well as their published equivalents, and other equivalents or corresponding applications, if any, in corresponding cases in the Federal Republic of Germany and elsewhere, and the references cited in any of the documents cited herein, are hereby incorporated by reference as if set forth in their entirety herein.

The details in the patents, patent applications and publications may be considered to be incorporable, at applicant's option, into the claims during prosecution as further limitations in the claims to patentably distinguish any amended claims from any applied prior art.

Some examples of handrails which could possibly be utilized or adapted for use in accordance with the present invention may be disclosed in the following U.S. Pat. No. 5,181,595, issued to inventors Tietze et al. on Jan. 26, 1993; U.S. Pat. No. 5,226,522, issued to inventors Johnson et al. on Jul. 13, 1993; U.S. Pat. No. 5,366,061, issued to inventors Kruse et al. on Nov. 11, 1994; U.S. Pat. No. 4,762,217, issued to inventor Steacy on Aug. 9, 1988; U.S. Pat. No. 4,852,713, issued to inventors Tatai et al. on Oct. 1, 1989; U.S. Pat. No. 5,275,270, issued to inventor Dobo on Jan. 4, 1994; and U.S. Pat. No. 5,255,772, issued to inventors Ball et al. on Oct. 26, 1993.

Some examples of polymer fibers, such as polyester fiber, which could possibly be utilized or adapted for use in accordance with the present invention may be disclosed in the following U.S. Pat. No. 5,242,645, issued to inventors Sasamoto et al. on Sep. 7, 1993; U.S. Pat. No. 5,423,956, issued to inventors White et al. on Jun. 13, 1995; U.S. Pat. No. 5,427,854, issued to inventors Goodrich et al. on Jun. 27, 1995; and U.S. Pat. No. 5,436,275, issued to inventors Kawasaki et al. on Jul. 25, 1995.

Some examples of aramid fibers which could possibly be utilized or adapted for use in accordance with the present invention may be disclosed in the following U.S. Pat. No. 4,418,164, issued to inventors Logullo et al. on Nov. 29, 1983; U.S. Pat. No. 4,510,202, issued to inventor Hatchard on Apr. 9, 1985; U.S. Pat. No. 5,330,698, issued to inventors Allen et al. on Jul. 19, 1994; U.S. Pat. No. 5,393,477, issued to inventors Ittel et al. on Feb. 28, 1995; U.S. Pat. No. 5,391,623, issued to inventor Frances on Feb. 21, 1995; U.S. Pat. No. 5,443,896, issued to inventor Rebouillat on Aug. 22, 1995; and U.S. Pat. No. 5,478,648, issued to inventors Stein et al. on Dec. 26, 1995.

Some examples of polyamide fibers which could possibly be utilized or adapted for use in accordance with the present invention may be disclosed in the following U.S. Pat. No. 5,324,392, issued to inventors Tate et al. on Jun. 28, 1994; U.S. Pat. No. 5,437,689, issued to inventors Rembold et al. on Mar. 7, 1994; and U.S. Pat. No. 5,447,980, issued to inventor Reichmann on Sep. 5, 1995.

Some examples of fiber finishes or fiber finishing agents which could possibly be utilized or adapted for use in accordance with the present invention may be disclosed in the following U.S. Pat. No. 4,725,635, issued to inventors Okada et al. on Feb. 16, 1988; U.S. Pat. No. 4,868,262, issued to inventors Esselborn et al. on Sep. 19, 1989; and U.S. Pat. No. 4,880,906, issued to inventors Esselborn et al. on Nov. 14, 1989.

Some examples of thermoplastic elastomers which could possibly be utilized or adapted for use in accordance with the present invention may be disclosed in the following U.S. Pat. No. 5,397,932, issued to inventor Ellul on Mar. 14, 1995; U.S. Pat. No. 5,397,835, issued to inventor Olivier on Mar. 14, 1995; U.S. Pat. No. 5,405,909, issued to inventors Ohmae et al. on Apr. 11, 1995; U.S. Pat. No. 5,427,595, issued to inventors Pihl et al. on Jun. 27, 1995; and U.S. Pat. No. 5,446,064, issued to inventors Hori et al. on Aug. 29, 1995.

Some examples of methods of co-extrusion which could possibly be utilized or adapted for use in accordance with the present invention may be disclosed in the following U.S. Pat. No. 5,324,187, issued to inventor Cook on Jun. 28, 1994; U.S. Pat. No. 5,405,565, issued to inventors Sumida et al. on Apr. 11, 1995; and U.S. Pat. No. 5,409,772, issued to inventors Yabusa et al. on Apr. 25, 1995.

Some examples of fabric layers to be used as sliding layers which could possibly be utilized or adapted for use in accordance with the present invention may be disclosed in the following U.S. Pat. No. 5,631,085, issued to inventors Gebauer et al. on May 20, 1997; U.S. Pat. No. 4,074,512, issued to inventor Matt in February, 1978; U.S. Pat. No. 3,815,468, issued to inventors Matt et al. in June, 1974; and U.S. Pat. No. 3,765,978, issued to inventor Matt in October, 1972.

One feature or aspect of an embodiment of the invention resides broadly in a people mover, such as an escalator or moving walkway, said mover comprising: a movable surface; said movable surface being configured to move to transport people; at least one balustrade; said at least one balustrade being disposed adjacent said movable surface; said at least one balustrade having an inner skirt panel; said inner skirt panel being disposed adjacent said movable surface; said inner skirt panel being disposed adjacent a bottom portion of said at least one balustrade; said at least one balustrade having an outer deck panel; said outer deck panel being disposed adjacent said bottom portion of said at least one balustrade; said at least one balustrade comprising a guide structure; said guide structure being disposed in or on at least an upper portion of said at least one balustrade; a handrail; said guide structure being configured to guide said handrail; said handrail being configured and disposed to move along said guide structure on at least an upper portion of said at least one balustrade; said handrail comprising: a grip portion to be gripped by the hand of a user of said people mover; a layer to stabilize and retain the shape of said grip portion; said stabilizing layer comprising at least one elongated member having an elongated dimension and at least one other dimension smaller than said elongated dimension of said at least one elongated member; said at least one elongated member having a longitudinal axis along said elongated dimension of said at least one elongated member; said longitudinal axis of said at least one elongated member being oriented in a transverse direction with respect to the direction of movement of said handrail; a final layer being configured and disposed to reduce friction between said handrail and said guide structure; said friction-reducing layer being disposed between said stabilizing layer and said guide structure; a layer to reinforce the structure of said handrail; said reinforcing layer comprising at least one elongated insert having an elongated dimension and at least one other dimension smaller than said elongated dimension of said at least one elongated insert; said at least one elongated insert having a longitudinal axis along said elongated dimension of said at least one elongated insert; said longitudinal axis of said at least one elongated insert being oriented along the direction of movement of said handrail; said reinforcing layer being disposed between said stabilizing layer and said friction-reducing layer; said stabilizing layer, said friction-reducing layer and said reinforcing layer being connected to each other to form a one-piece structure; and said one-piece structure being disposed between said grip portion and said guide structure; said one-piece structure being connected to said grip portion.

Another feature or aspect of an embodiment of the invention resides broadly in a handrail for a people mover, such as an escalator or moving walkway, said handrail comprising: a grip portion to be gripped by the hand of a user of said people mover; said grip portion having an elongated dimension and at least one other dimension smaller than said elongated dimension of said grip portion; a layer being configured and disposed to reduce friction between said handrail and a guide structure of a people mover; a layer to stabilize and retain the shape of said grip portion; said stabilizing layer comprising at least one elongated member having an elongated dimension and at least one other dimension smaller than said elongated dimension of said at least one elongated member; said at least one elongated member having a longitudinal axis along said elongated dimension of said at least one elongated member; said longitudinal axis of said at least one elongated member being oriented in a transverse direction with respect to said elongated dimension of said grip portion; said stabilizing layer being disposed between said grip portion and said friction-reducing layer; a layer to reinforce the structure of said handrail; said reinforcing layer comprising at least one elongated insert having an elongated dimension and at least one other dimension smaller than said elongated dimension of said at least one elongated insert; said at least one elongated insert having a longitudinal axis along said elongated dimension of said at least one elongated insert; said longitudinal axis of said at least one elongated insert being oriented along said elongated dimension of said grip portion; said reinforcing layer being disposed between said stabilizing layer and said friction-reducing layer; said stabilizing layer, said friction-reducing layer and said reinforcing layer being connected to each other to form a one-piece structure; and said one-piece structure being disposed adjacent to and attached to said grip portion.

Yet another feature or aspect of an embodiment of the invention resides broadly in a method for making a handrail for a people mover, such as an escalator or moving walkway, said handrail comprising: a grip portion to be gripped by the hand of a user of said people mover; said grip portion having an elongated dimension and at least one other dimension smaller than said elongated dimension of said grip portion; a layer being configured and disposed to reduce friction between said handrail and a guide structure of a people mover; a layer to stabilize and retain the shape of said grip portion; said stabilizing layer comprising at least one elongated member having an elongated dimension and at least one other dimension smaller than said elongated dimension of said at least one elongated member; said at least one elongated member having; longitudinal axis along said elongated dimension of said at least one elongated member; said longitudinal axis of said at least on, elongated member being oriented in a transverse direction with respect to said elongated dimension of said grip portion; said stabilizing layer being disposed between said grip portion and said friction-reducing layer; a layer to reinforce the structure of said handrail; said reinforcing layer comprising at least one elongated insert having an elongated dimension and at least one other dimension smaller than said elongated dimension of said at least one elongated insert; said at least one elongated insert having a longitudinal axis along said elongated dimension of said at least one elongated insert; said longitudinal axis of said at least one elongated insert being oriented along said elongated dimension of said grip portion; said reinforcing layer being disposed between said stabilizing layer and said friction-reducing layer; said stabilizing layer, said friction-reducing layer and said reinforcing layer being connected to each other 1 form a one-piece structure; and said one-piece structure being disposed adjacent to and attached to said grip portion, said method comprising the following steps of: combining said stabilizing layer and said reinforcing layer into one layer using a knitting process; joining said friction-reducing layer with said stabilizing layer and said reinforcing layer into said one-piece structure; and attaching said one-piece structure to said grip using a fabrication or single fabrication process, such as co-extrusion or adhesive bonding.

Still another feature or aspect of an embodiment of the invention resides broadly in a handrail for moving walkways and escalators with a grip made of polymer material, a reinforcement layer that absorbs tensile forces, a shape-stabilizing layer consisting of textile inserts oriented in a transverse direction, and a final anti-friction layer, characterized by the fact that the layers are combined into a one-piece textile structure and can be connected to the grip in a single fabrication process.

A further feature or aspect of an embodiment of the invention resides broadly in a handrail, characterized by the fact that the textile structure is formed from at least the following parts: -a reinforcement layer made of high-modulus fibers that run longitudinally, -a transverse reinforcement with fibers oriented transversely, -an anti-friction layer made of polymer fibers in the form of a textile structure.

Another feature or aspect of an embodiment of the invention resides broadly in a handrail, characterized by the fact that the reinforcement layer is made of high-modulus, longitudinally oriented fibers such as polymer fibers (aramid, polyester, polyamide), carbon, glass or steel fibers.

Yet another feature or aspect of an embodiment of the invention resides broadly in a handrail, characterized by the fact that the fibers for transverse reinforcement are made of polymer and/or glass fibers.

Still another feature or aspect of an embodiment of the invention resides broadly in a handrail, characterized by the fact that the grip and insert can be combined into a textile structure by means of co-extrusion.

A further feature or aspect of an embodiment of the invention resides broadly in a handrail, characterized by the fact that the grip and insert can be joined together by adhesive.

A further feature or aspect of an embodiment of the invention resides broadly in a handrail, characterized by the fact that a longitudinal reinforcement is located only in the central portion.

Another feature or aspect of an embodiment of the invention resides broadly in a handrail, characterized by the fact that the grip is made of a thermoplastic elastomer material.

Yet another feature or aspect of an embodiment of the invention resides broadly in a handrail, characterized by the fact that a textile structure is located underneath and/or inside the grip.

Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the following claims. In the claims, means-plus-function clause are intended to cover the structures described herein as performing the recited function and not only structural equivalents but also equivalent structures.

The invention as described hereinabove in the context of the preferred embodiments is not to be taken as limited to all of the provided details thereof, since modifications and variations thereof may be made without departing from the spirit and scope of the invention.

What is claimed is:

1. A people mover, such as an escalator or moving walkway, said people mover comprising:

a movable surface;

said movable surface being configured to move to transport people;

at least one balustrade;

said at least one balustrade being disposed adjacent said movable surface;

said at least one balustrade having an inner skirt panel;

said inner skirt panel being disposed adjacent said movable surface;

said inner skirt panel being disposed adjacent a bottom portion of said at least one balustrade;

said at least one balustrade having an outer deck panel;

said outer deck panel being disposed adjacent said bottom portion of said at least one balustrade;

said at least one balustrade comprising a guide structure;

said guide structure being disposed in or on at least an upper portion of said at least one balustrade;

a handrail;

said guide structure being configured to guide said handrail;

said handrail being configured and disposed to move along said guide structure on at least an upper portion of said at least one balustrade; and said handrail comprising:

a grip portion to be gripped by the hand of a user of said people mover;

a sole woven layer to reduce friction between said handrail and said guide structure of said people mover;

said friction-reducing layer comprising texturized fibers disposed within said friction-reducing layer to minimize projection of said texturized fibers from said friction-reducing layer;

a sole layer to stabilize and retain the shape of said grip portion;

said stabilizing layer comprising a textile structure comprising fibers;

said stabilizing layer being disposed between said grip portion and said friction-reducing layer;

a layer to reinforce the structure of said handrail;

said reinforcing layer being disposed between said stabilizing layer and said friction-reducing layer;

said stabilizing layer, said friction-reducing layer and said reinforcing layer being warp-knitted to each other to form a one-piece warp-knitted textile structure; and said one-piece warp-knitted textile structure being disposed adjacent to and attached to said grip portion.

2. The people mover according to claim 1, wherein said fibers of said stabilizing layer comprise at least one of: polymer fibers and glass fibers.

3. The people mover according to claim 1, wherein said grip portion comprises a thermoplastic elastomer material.

4. The people mover according to claim 1, wherein said grip portion and said one-piece warp-knitted textile structure are adhesively attached to each other.

5. The people mover according to claim 1, wherein said reinforcing layer is located only in a central portion of said hand rail.

6. The people mover according to claim 1, wherein said one-piece warp-knitted textile structure is located underneath said grip portion and/or on the interior of said grip portion.

7. The people mover according to claim 1, wherein:

said grip portion and said one-piece warp-knitted textile together comprise a co-extruded structure; and said co-extruded structure comprises textile.

8. The people mover according to claim 1, wherein:

said reinforcing layer comprises high-modulus, longitudinally oriented fibers; and said fibers comprise one of: aramid, polyester, polyamide, carbon, glass or steel.

9. The people mover according to claim 2, wherein said grip portion comprises a thermoplastic elastomer material.

10. The people mover according to claim 9, wherein said reinforcing layer is located only in a central portion of said hand rail.

11. The people mover according to claim 10, wherein said one-piece warp-knitted textile structure is located underneath said grip portion and/or on the interior of said grip portion.

12. The people mover according to claim 11, wherein:

said reinforcing layer comprises high-modulus, longitudinally oriented fibers; and said fibers comprise one of: aramid, polyester, polyamide, carbon, glass or steel.

13. The people mover according to claim 12, wherein said grip portion and said one-piece warp-knitted textile structure are adhesively attached to each other.

14. The people mover according to claim 12, wherein:

said grip portion and said one-piece warp-knitted textile together comprise a co-extruded structure; and said co-extruded structure comprises textile.

* * * * *